(12) United States Patent
Haustein et al.

(10) Patent No.: US 9,524,102 B2
(45) Date of Patent: *Dec. 20, 2016

(54) OPTIMIZING MIGRATION/COPY OF DE-DUPLICATED DATA

(75) Inventors: Nils Haustein, Soergenloch (DE); Thorsten Krause, Mainz (DE); Daniel J. Winarski, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 981 days.

This patent is subject to a terminal disclaimer.

(21) Appl. No.: 13/608,559

(22) Filed: Sep. 10, 2012

(65) Prior Publication Data
US 2013/0138883 A1    May 30, 2013

Related U.S. Application Data

(63) Continuation of application No. 13/307,763, filed on Nov. 30, 2011.

(51) Int. Cl.
*G06F 12/00*    (2006.01)
*G06F 3/06*    (2006.01)
*G06F 11/14*    (2006.01)

(52) U.S. Cl.
CPC ............ *G06F 3/0605* (2013.01); *G06F 3/065* (2013.01); *G06F 3/0613* (2013.01);
(Continued)

(58) Field of Classification Search
CPC .... G06F 3/0605; G06F 3/0613; G06F 3/0647; G06F 3/065; G06F 11/1453; G06F 11/1456
(Continued)

(56) References Cited

U.S. PATENT DOCUMENTS 4,417,321 A * 11/1983 Chang et al.
7,330,997 B1 * 2/2008 Odom .......................... 714/6.23
(Continued)

FOREIGN PATENT DOCUMENTS

| CN | 101286156 A | 10/2008 |
|----|----|----|
| JP | 2011-065314 | 3/2011 |
| JP | 2011-509459 | 3/2011 |

OTHER PUBLICATIONS

U.S. Appl. No. 13/307,763, 1 page.
(Continued)

*Primary Examiner* — Charles Rones
*Assistant Examiner* — Nanci Wong
(74) *Attorney, Agent, or Firm* — Francis Lammes; Stephen J. Walder, Jr.; Parashos T. Kalaitzis

(57) ABSTRACT

A mechanism is provided for optimizing migration/copying of de-duplicated data from an internal storage system to a removable storage system. A preliminary number of clusters to be generated are determined for sets of data objects stored on the internal storage system based on a number of the sets of data objects. The preliminary number of clusters is generated based on shortest distances between the sets of data objects, each cluster comprising one or more sets of data objects and each set of data objects comprising one or more chunks of data. A chosen cluster is identified from a set of clusters by identifying a cluster having a greatest number of common chunks within as few sets of data objects. Responsive to an export-size of the chosen cluster failing to exceed the available storage capacity of the removable storage system, the chosen cluster is exported to the removable storage system.

7 Claims, 7 Drawing Sheets

(52) U.S. Cl.
CPC .......... *G06F 3/0647* (2013.01); *G06F 3/0682* (2013.01); *G06F 11/1453* (2013.01); *G06F 11/1456* (2013.01); *G06F 2201/815* (2013.01)

(58) Field of Classification Search
USPC ........................................................ 711/161
See application file for complete search history.

(56) References Cited

U.S. PATENT DOCUMENTS

| | | | |
|---|---|---|---|
| 7,669,023 | B2 | 2/2010 | Murase |
| 8,949,208 | B1* | 2/2015 | Xu et al. ...................... 707/698 |
| 2004/0128511 | A1* | 7/2004 | Sun et al. ..................... 713/176 |
| 2006/0236371 | A1* | 10/2006 | Fish .................................. 726/2 |
| 2008/0168228 | A1* | 7/2008 | Carr et al. .................... 711/117 |
| 2009/0177855 | A1 | 7/2009 | Drews et al. |
| 2009/0193223 | A1 | 7/2009 | Saliba et al. |
| 2009/0310408 | A1* | 12/2009 | Lee et al. ................. 365/185.03 |
| 2010/0042790 | A1 | 2/2010 | Mondal et al. |
| 2010/0205163 | A1 | 8/2010 | Eshghi et al. |
| 2010/0205389 | A1 | 8/2010 | Kishi |
| 2010/0223441 | A1 | 9/2010 | Lillibridge et al. |
| 2011/0099351 | A1* | 4/2011 | Condict ........................ 711/216 |
| 2011/0231826 | A1* | 9/2011 | Narasimhan .................. 717/128 |
| 2011/0307657 | A1* | 12/2011 | Timashev et al. ............ 711/112 |
| 2013/0212074 | A1* | 8/2013 | Romanski et al. ........... 707/692 |

OTHER PUBLICATIONS

"Deduplication and replication solutions guide", HP StorageWorks, Virtual Library Systems, D2D Backup System, http://bizsupport2.austin.hp.com/bc/docs/support/SupportManual/c01729131/c01729131.pdf, Fourth edition, Apr. 2009, 138 pages.

"IBM TSM Backup with EMC Data Domain Deduplication Storage", Best Practices Planning, white paper, EMC Corporation, http://www.emc.com/collateral/hardware/white-papers/h8065-ibm-tsm-backup-data-domain-wp.pdf, Oct. 2010, 25 pages.

Poelker, Chris, "Who says tape is dead!", http://www.falconstor.com/community/blogs/chris-poelker/item/297-who-says-tape-is-dead, Mar. 23, 2011, 3 pages.

Zhu, Benjamin et al., "Avoiding the Disk Bottleneck in the Data Domain Deduplication File System", http://www.cs.princeton.edu/courses/archive/fall09/cos318/reading/dedup.pdf, printed Jul. 25, 2011, 14 pages.

International Search Report and Written Opinion dated Dec. 18, 2012, International Application No. PCT/JP2012/007274, 8 pages.

You, Lawrence L. et al., "Deep Store: An Archival Storage System Architecture", Proceedings of the 21st International Conference on Data Engineering (ICDE 2005), Apr. 5, 2005, 12 pages.

\* cited by examiner

OPTIMIZING MIGRATION/COPY OF DE-DUPLICATED DATA

BACKGROUND

The present application relates generally to an improved data processing apparatus and method and more specifically to mechanisms for optimizing migration/copy of de-duplicated data.

In one illustrative embodiment, a method, in a data processing system, is provided for optimizing migration/copying of de-duplicated data from an internal storage system to a removable storage system. The illustrative embodiment determines a preliminary number of clusters to be generated for sets of data objects stored on the internal storage system based on a number of the sets of data objects. The illustrative embodiment generates the preliminary number of clusters based on shortest distances between the sets of data objects. In the illustrative embodiment, each cluster comprises one or more sets of data objects and each set of data objects comprises one or more chunks of data. The illustrative embodiment identifies a chosen cluster from a set of clusters by identifying a cluster having a greatest number of common chunks within as few sets of data objects as possible. The illustrative embodiment determines whether an export-size of the chosen cluster exceeds an available storage capacity of the removable storage system. The illustrative embodiment exports the chosen cluster to the removable storage system in response to the export-size of the chosen cluster failing to exceed the available storage capacity of the removable storage system.

In other illustrative embodiments, a computer program product comprising a computer useable or readable medium having a computer readable program is provided. The computer readable program, when executed on a computing device, causes the computing device to perform various ones of, and combinations of the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in or will become apparent to those of ordinary skill in the art in view of, the following detailed description of the example embodiments of the present invention.

BRIEF DESCRIPTION OF THE SEVERAL VIEWS OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION

As the inventors herein have recognized, cost efficiency is an important aspect when storing data in a storage environment. One way to achieve cost efficiency is through data de-duplication. Data de-duplication sorts out identical pieces of data and stores only unique instances of data on a storage subsystem. Other instances of data which are identical with the uniquely stored instance, thus, only reference the stored instance. Storing data using de-duplication saves storage capacity, because only unique instances of data are stored, while other instances are referenced to this one instance.

While data de-duplication may save storage capacity by creating sets of or chunks of de-duplicated data objects, comparing an identity of chunks, and storing identical chunks only once, subsequent migration of de-duplicated data objects (i.e. chunks) to a removable storage medium for backup and/or recovery purposes currently do not benefit from de-duplication used on resident storage subsystems. That is, various current methods migrate de-duplicated data to a removable storage medium by rebuilding the data objects from the chunks and storing each data object in the data objects entirety. Thus, migration of de-duplicated data makes the cost efficiency of de-duplication obsolete because data is stored in its original fashion.

Other current methods migrate de-duplicated data to a removable storage medium by storing the chunks directly on the removable storage medium. However, migration of the chunks may result in having the actual chunk on one piece of removable storage medium while a reference to the chunk may reside on another piece of removable storage medium. Therefore, the restore operation of the data object becomes extremely time-consuming because many pieces of removable storage medium may have to be mounted and read, which may result in unacceptable times for restoration.

Thus, the illustrative embodiments provide mechanisms for migrating/copying de-duplicated data to removable storage system while keeping the entity of a data object with all chunks or references to chunks on the same piece of removable media. A de-duplication engine performs a de-duplication process that selects a set of unique chunks pertaining to a set of data objects that may be adequately stored on a piece of removable storage system. That is, the mechanisms of the illustrative embodiments identify unique chunks for all data objects to be migrated/copied to a removable storage system from a de-duplication table that tracks the chunks associated with the data objects. If a set of similar-chunk clusters are identified that may adequately be stored on the removable storage system, then the set of clusters are migrated/copied onto the removable storage system.

Figure 1:
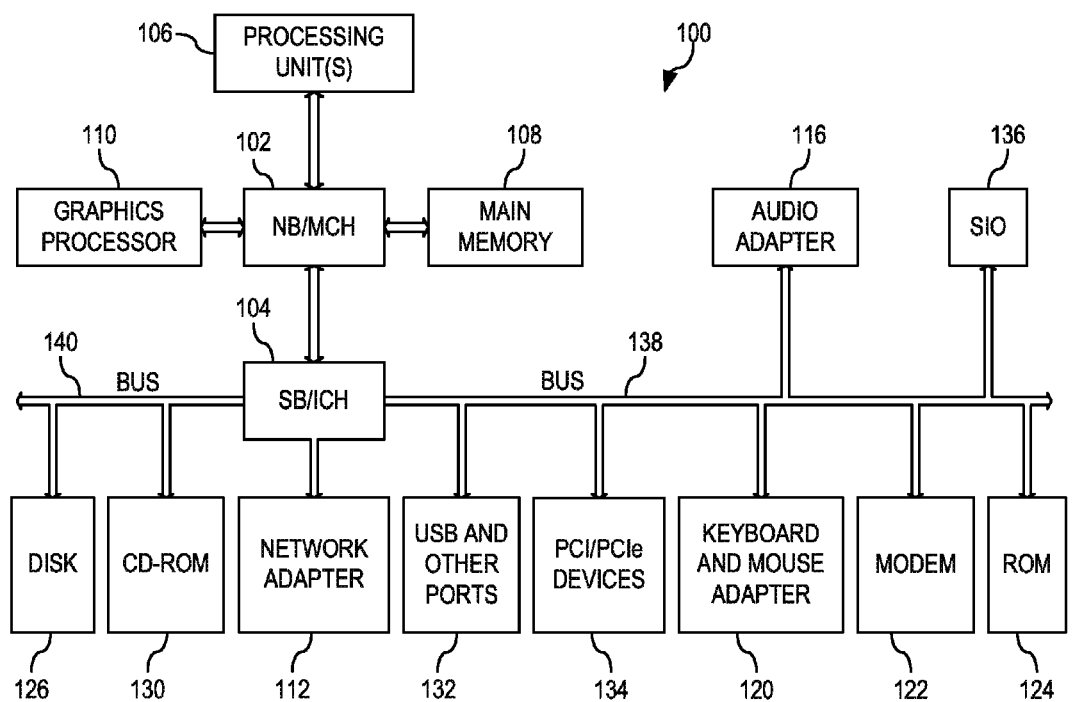
FIG. 1 is a block diagram of an example data processing system in which aspects of the illustrative embodiments may be implemented.

Thus, the illustrative embodiments may be utilized in many different types of data processing environments. In order to provide a context for the description of the specific elements and functionality of the illustrative embodiments, FIG. 1 is provided hereafter as an example environment in which aspects of the illustrative embodiments may be implemented. It should be appreciated that FIG. 1 is only an example and is not intended to assert or imply any limitation with regard to the environments in which aspects or embodiments of the present invention may be implemented. Many modifications to the depicted environment may be made without departing from the spirit and scope of the present invention.

FIG. 1 is a block diagram of an example data processing system in which aspects of the illustrative embodiments may be implemented. Data processing system 100 is an example of a computer in which computer usable code or instructions implementing the processes for illustrative embodiments of the present invention may be located.

In the depicted example, data processing system 100 employs a hub architecture including north bridge and memory controller hub (NB/MCH) 102 and south bridge and input/output (I/O) controller hub (SB/ICH) 104. Processing unit 106, main memory 108, and graphics processor 110 are connected to NB/MCH 102. Graphics processor 110 may be connected to NB/MCH 102 through an accelerated graphics port (AGP).

In the depicted example, local area network (LAN) adapter 112 connects to SB/ICH 104. Audio adapter 116, keyboard and mouse adapter 120, modem 122, read only memory (ROM) 124, hard disk drive (HDD) 126, CD-ROM drive 130, universal serial bus (USB) ports and other communication ports 132, and PCI/PCIe devices 134 connect to SB/ICH 104 through bus 138 and bus 140. PCI/PCIe devices may include, for example, Ethernet adapters, add-in cards, and PC cards for notebook computers. PCI uses a card bus controller, white PCIe does not. ROM 124 may be, for example, a flash basic input/output system (BIOS).

HDD 126 and CD-ROM drive 130 connect to SB/ICH 104 through bus 140. Him) 126 and CD-ROM drive 130 may use, for example, an integrated drive electronics (IDE) or serial advanced technology attachment (SATA) interface. Super I/O (SIO) device 136 may be connected to SB/ICH 104. In one embodiment, HDD 126 is a solid state drive (SDD). In yet another embodiment, disk drive 130 is a Digital Versatile Disk (DVD) drive or a Blu-Ray Disk (BD) drive.

An operating system runs on processing unit 106. The operating system coordinates and provides control of various components within the data processing system 100 in FIG. 1. As a client, the operating system my be a commercially available operating system such as Microsoft Windows 7 (Microsoft and Windows are trademarks of Microsoft Corporation in the United States, other countries, or both). An Object-oriented programming system, such as the Java programming system, may run in conjunction with the operating system and provides calls to the operating system from Java programs or applications executing on data processing system 100 (Java is a trademark of Oracle and/or its affiliates.).

As a server, data processing system 100 may be, for example, an IBM® eServer™ System P® computer system, running the Advanced Interactive Executive (AIX®) operating system or the LINUX operating system (IBM, eServer, System p, and AIX are trademarks of International Business Machines Corporation in the United States, other countries, or both, and LINUX is a registered trademark of Linus Torvalds in the United States, other countries, or both). Types of LINUX operating systems include, but are not limited to, Red Hat Enterprise Linux (RHEL) and Debian Linux. Data processing system 100 may be asymmetric multiprocessor (SMP) system including a plurality of processors in processing unit 106. Alternatively, a single processor system may be employed.

Instructions for the operating system, the object-oriented programming system, and applications or programs are located on storage devices, such as HDD 126, and may be loaded into main memory 108 for execution by processing unit 106. The processes for illustrative embodiments of the present invention may be performed by processing unit 106 using computer usable program code, which may be located in a memory such as, for example, main memory 108, ROM 124, or in one or more peripheral devices 126 and 130, for example.

A bus system, such as bus 138 or bus 140 as shown in FIG. 1, may be comprised of one or more buses. Of course, the bus system may be implemented using any type of communication fabric or architecture that provides for a transfer of data between different components or devices attached to the fabric or architecture. A communication unit, such as modem 122 or network adapter 112 of FIG. 1, may include one or more devices used to transmit and receive data. A memory may be, for example, main memory 108, ROM 124, or a cache such as found in NB/MCH 102 in FIG. 1.

Those of ordinary skill in the art will appreciate that the hardware in FIG. 1 may vary depending on the implementation. Other internal hardware or peripheral devices, such as flash memory, equivalent non-volatile memory, or optical disk drives (including Compact Disk, Digital Versatile Disk, and Blu-Ray Disk) and the like, may be used in addition to or in place of the hardware depicted in FIG. 1. Also, the processes of the illustrative embodiments may be applied to a multiprocessor data processing system, other than the SUP system mentioned previously, without departing from the spirit and scope of the present invention.

Moreover, the data processing system 100 may take the form of any of a number of different data processing systems including client computing devices, server computing devices, a tablet computer, laptop computer, telephone or other communication device, a personal digital assistant (PDA), or the like. In some illustrative examples, data processing system 100 may be a portable computing device that is configured with flash memory to provide non-volatile memory for storing operating system files and/or user-generated data, for example. Essentially, data processing system 100 may be any known or later developed data processing system without architectural limitation.

Again, the mechanisms of the illustrative embodiments provide for migrating/copying de-duplicated data stored on a non-removable storage system, such as hard disk drive (HDD) 126 of FIG. 1, to a removable storage system, such as CD-ROM 130 of FIG. 1, a Linear Tape File System (LTFS), or the like, while keeping the entity of a data object together on the same piece of removable storage system. The mechanisms identify unique chunks from sets of data objects to be migrated/copied to a removable storage system from a de-duplication table that tracks chunks associated with the data objects. The mechanisms derive a chunk reference table which lists the number of references for each unique chunk stored on the first storage medium. The mechanisms reduce the chunk reference table by eliminating the chunks which have less than two references and, for the remaining chunks, create a chunk matrix [C] that maps chunks to data objects. Based on the chunk matrix [C], the mechanisms create a vector for each data object represented in an n-dimensional area, calculate a "metric," such as, for example, a Euclidean distance between the vectors, and insert the Euclidian distance into a metric matrix [M]. A Euclidean distance is a distance between two points. From the metric matrix [M], the mechanisms identify clusters of data objects with the shortest distances in means of having most chunks in common. When multiple clusters with the same distance have been found, the mechanisms determine a preferred cluster by random. Based on the preferred cluster determination, the mechanisms determined a required storage space (export size) of the cluster and compare the required storage size to a capacity of the removable storage system. If the export size is greater than the capacity of the removable storage system, then the mechanisms mark the cluster as forbidden and determine the next preferred cluster. If the export size is less than the capacity of the removable storage system minus an optional predefined safety margin, the mechanisms calculate a new cluster point and then calculate a Euclidean distance between other data objects and the new cluster point. Upon that, further data objects are added to the cluster until the desired size of exporting is reached. If the export size is less than the capacity of the removable storage system and greater than the capacity of the removable storage system minus the optional predefined safety margin, then the mechanisms invoke the migration/copy process.

Figure 2:
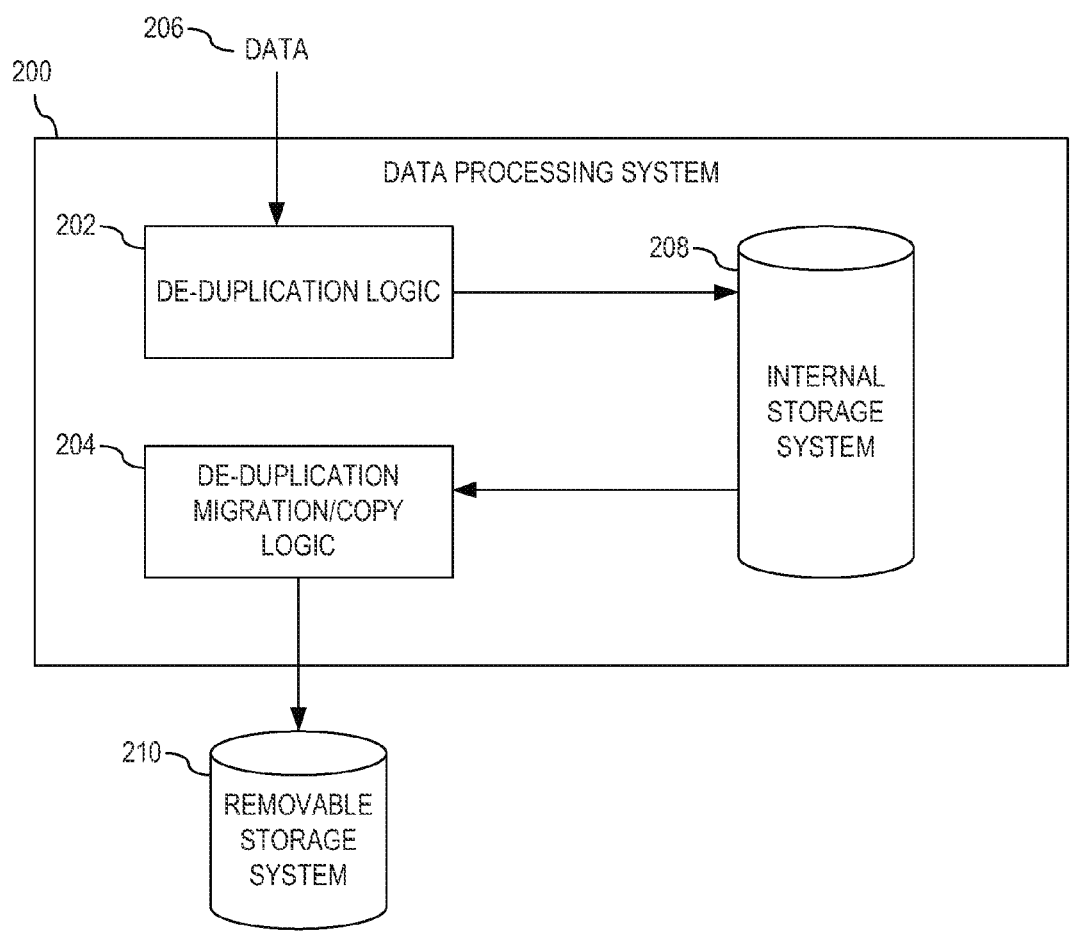
FIG. 2 depicts a functional block diagram of a mechanism for migrating/copying de-duplicated data to a removable storage system in accordance with an illustrative embodiment.
Figure 3A:
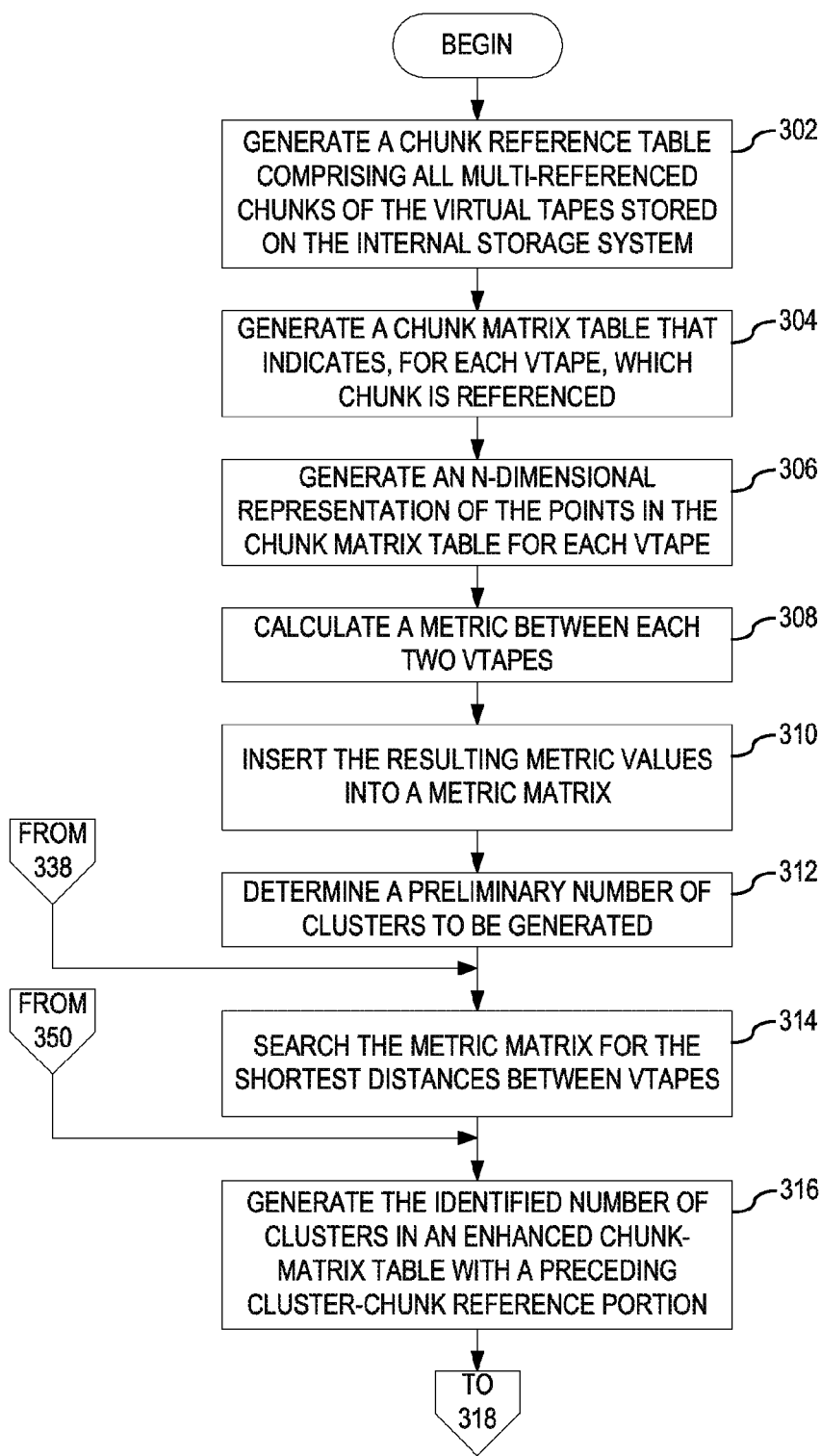
FIGS. 3A-3D depict a flow diagram of the operation performed by de-duplication migration/copy logic in optimizing migration/copy of de-duplicated data from an internal storage system to a removable storage system in accordance with an illustrative embodiment.
Figure 3B:
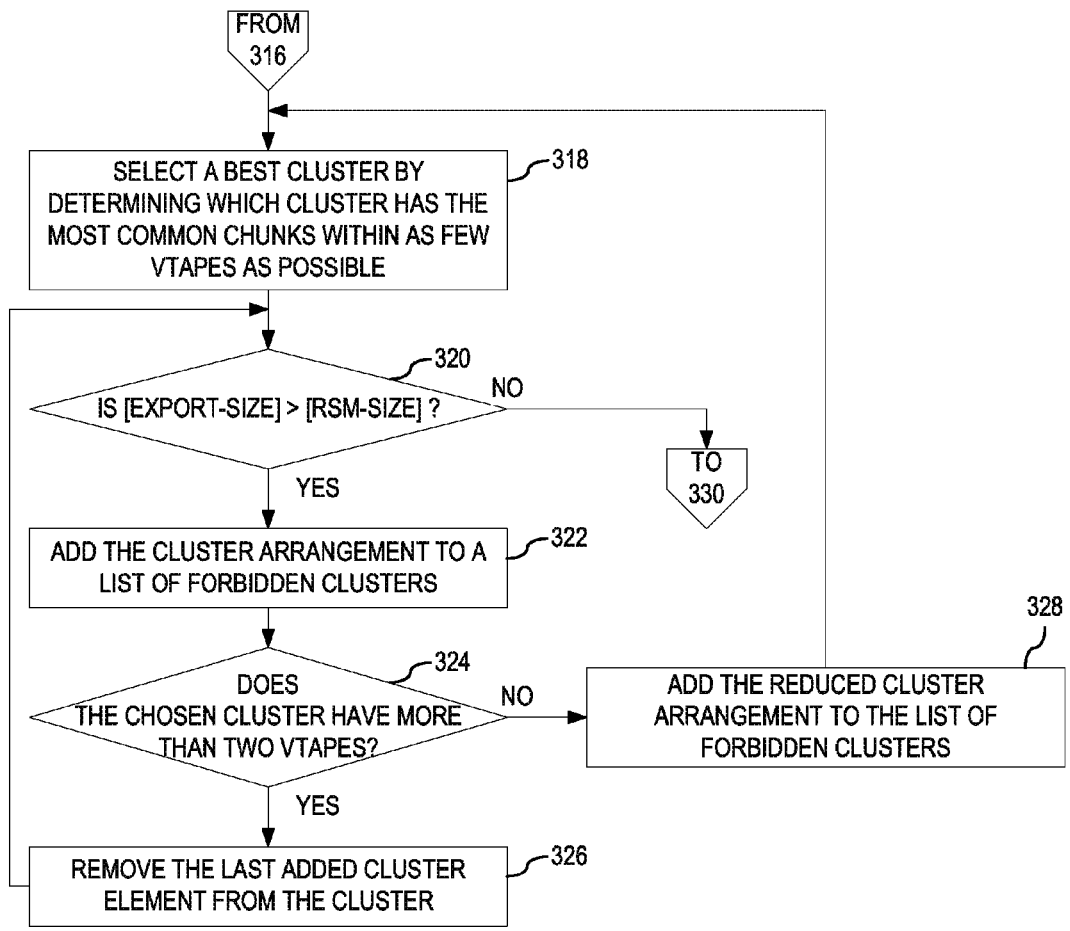
Figure 3C:
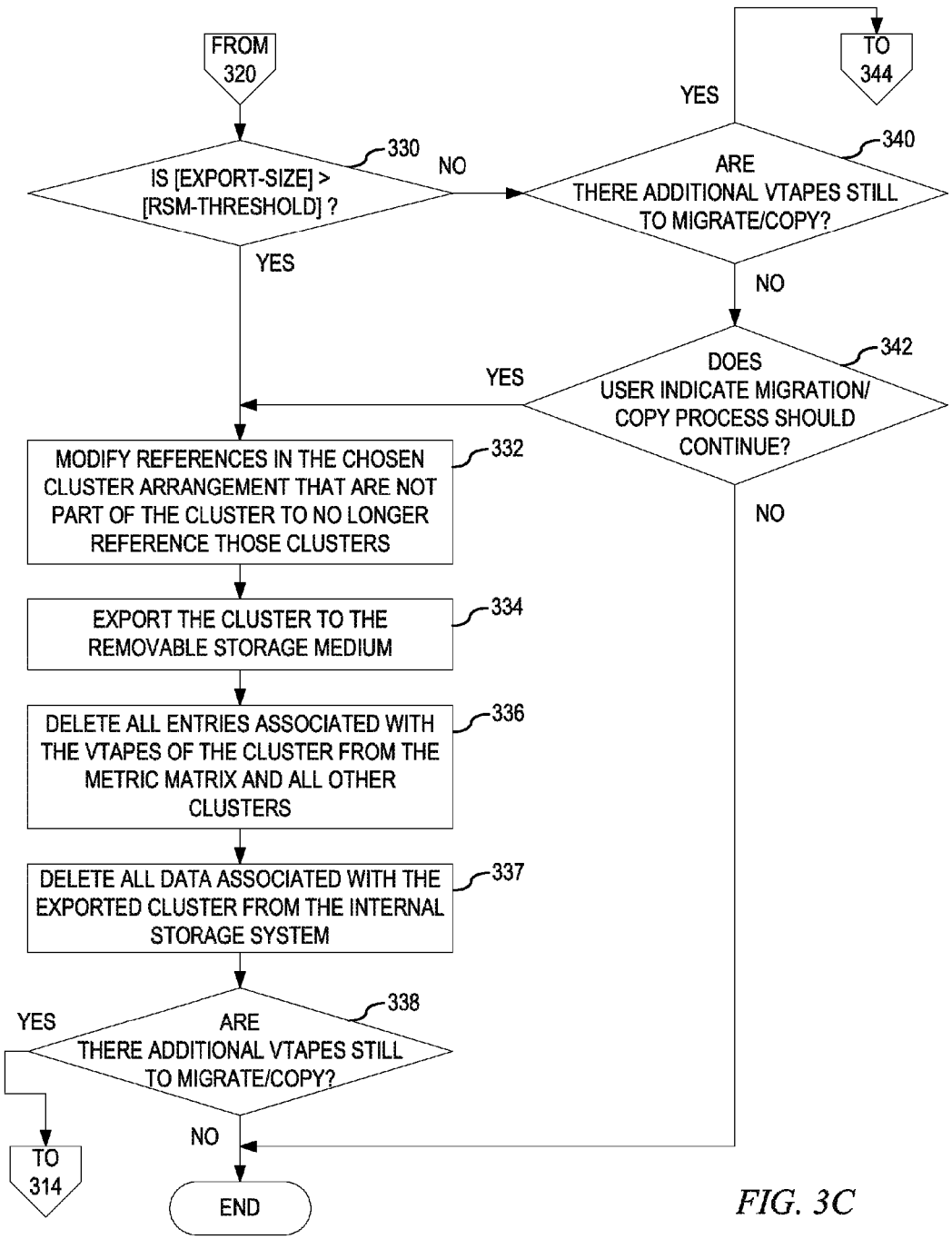
Figure 3D:
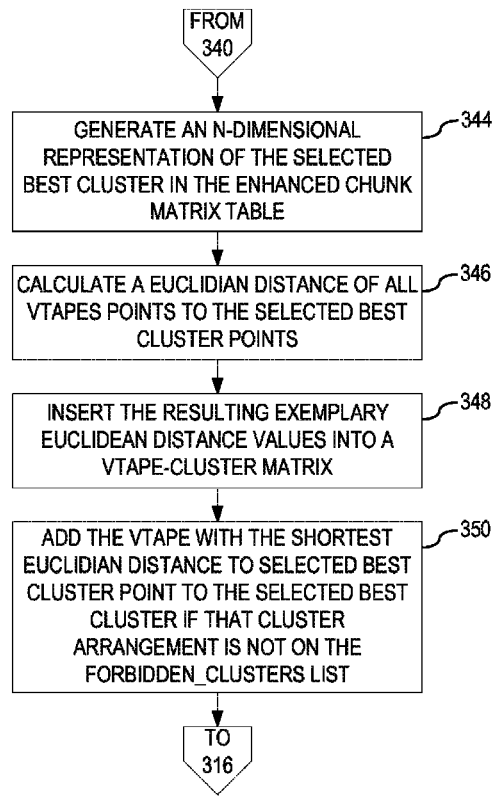

FIG. 2 depicts a functional block diagram of a mechanism for migrating/copying de-duplicated data to a removable storage system in accordance with an illustrative embodiment. Data processing system 200 comprises de-duplication logic 202 and de-duplication migration/copy logic 204. De-duplication logic 202 receives data 206, sorts out unique portions of data 206, and stores only unique instances of data on internal storage system 208, which is not a removable storage system. Data 206 may be a data object that is subject for data de-duplication, such as a data stream, a data file, or a virtual tape. The illustrative embodiments use an exemplary term Virtual-tape (Vtape) to denote a data object to be de-duplicated. In data processing system 200, de-duplication logic 202 maintains a de-duplication table as illustrated by the following.

TABLE 1

De-duplication table.

| Vtape-Chunk-ID | Chunk Hash Digest | Storage Location |
|---|---|---|
| Vtape1-chunk1 (A01) | AABBCC12345 | 1 |
| Vtape1-chunk2 (A02) | BBCCDD54321 | 2 |
| Vtape1-chunk3 (A03) | CCDDEE67890 | 3 |
| Vtape1-chunk4 (A04) | DDEEFF09876 | 4 |
| Vtape2-chunk1 (A01p) | AABBCC12345 | 1 |
| Vtape2-chunk2 (B02) | EEFFGG12345 | 5 |
| Vtape2-chunk3 (B03) | FFGGHH12345 | 6 |

In order to store a data object represented by a Vtape, de-duplication logic 202 separates the Vtape into chunks and tracks each chunk in the Vtape-Chunk-ID column of the de-duplication table. While de-duplication logic 202 preferably keeps chunks at similar lengths, de-duplication logic 202 may also store chunks in variable lengths. De-duplication logic 202 calculates an identity characteristic of each chunk, which may be, for example, a hash "message digest" or simply "digest" which is an alphanumeric output of a cryptographical hash function such as Message Digit 5 (MD-5) or Secure Hash Algorithm (SHA-1, SHA-256, SHA-512). The digest is of a fixed length for a given hash function and will vary in length depending upon which hash function is being used. For example, a digest for MD-5 is 160 bits long and a digest for SHA-1 is 128 bits long. The input to the hash function is the chunk to be de-duplicated. Cryptographical hash functions are typically used for de-duplication because they are an "avalanche" functions, meaning that just one bit of difference between two chunks of data creates a significant change between the respective digests. De-duplication logic 202 stores the identity characteristic in a Chunk Hash Digest column of the de-duplication table. Prior to storing any chunk in the de-duplication table, de-duplication logic 202 determines whether a chunk of data precisely equal to a current chunk already existing within the de-duplication table, for example, by comparing the digests of the cryptographical hash for various chunks. If a chunk already exists, by having a digest precisely equal to the digest of an existing chunk, de-duplication logic 202 references the chunk to the storage location of the already existing chunk in a Storage Location column of the de-duplication table rather than storing the current chunk and wasting valuable storage space. If the chunk does not exist, de-duplication logic 202 stores the chunk and enters the digest of that new chunk in the Chunk Hash Digest column, and storage location of that new chunk in the Storage Location column, of the de-duplication table. The storage location may be one or more block addresses on internal storage system 208 or a combination of the of the Vtape and the number of the chunk on the Vtape, as described in the next paragraph.

Therefore, each chunk has a either a unique ID or points to a unique ID and de-duplication logic 202 stores the chunk information using the following semantic: Xzz(Y), where prefix "X" is the ID of the Vtape and "zz" is the number of the chunk on that specific Vtape. If a Y suffix is present, the presence of Y denotes that this is a pointer to the given chunk. Accordingly, with reference to the de-duplication table, the de-duplication logic separated Vtape1 into 4 chunks (Vtape-Chunk-ID column, rows 2-5) and the de-duplication logic separated Vtape2 into 3 chunks (Vtape-Chunk-ID column, rows 6-8). Since chunk1 of Vtape2 (Vtape-Chunk-ID column, row 6) has the same hash digest as chunk1 of Vtape1 (Vtape-Chunk-ID column, row 2), the de-duplication logic stores chunk1 of Vtape2 at the same location. Thus, the ID of chunk1 of Vtape2 is a changed to point to chunk1 of Vtape1.

De-duplication migration/copy logic 204 provides a user of data processing system 200 with a mechanism to migrate/copy de-duplicated data stored on internal storage system 208 to removable storage system 210, while keeping data object chunks and their respective data object chunk references together. In order to perform the migration/copy, de-duplication migration/copy logic 204 utilizes numerous variables to calculate an optimal combination of data objects to be stored on removable storage system 210 of a fixed capacity, these variables are as follows:

[chunk-size]: size of one data chunk, for example 1 MB.
[rsm-size]: size of the removable storage system, for example 40 MB.
[pointer to chunk of own Vtape]: pointer to a chunk in a respective Vtape.
[pointer to chunk of another Vtape]: pointer to a chunk of another Vtape.
[native-Vtape-size]: original size of a Vtape with no de-duplicated data.
[dedup-Vtape-size]: size of a Vtape comprising only one copy of each chunk and pointers to chunks; effectively a de-duplicated native Vtape (=[native-Vtape-size]–[pointer to chunk of own tape]).
[multi-ref-chunks]: the number of chunks which are referenced by other tapes also, marked bold below.

[dedup-cluster-size]: size of an agglomerated cluster of Vtapes that comprise only one copy of each chunk and pointers to chunks; effectively the sum of all data that needs to be migrated/copied.

While the de-duplication above depicts the storage of chunks from Vtape1 and Vtape2, one of ordinary skill in the art would recognize that many virtual tapes (Vtapes) may be stored on internal storage system 208 and that each Vtape may comprise varying numbers of chunks from that illustrated in the de-duplication table shown above. As an example, the following illustrates six Vtapes representations with their respective chunks as processed by de-duplication logic 202.

Vtape1 Representation:

| A01 | A02 | A03 | A04 | A05 | A06 | A07 | A08 | A09 | A10 |
|-----|-----|-----|-----|-----|-----|-----|-----|-----|-----|
| A11 | A12 | A13 | A14 | A15 |     |     |     |     |     |

Vtape2 Representation:

| A01p | B02 | B03 | B04 | A05p | B06 | B07 | B08 | B09 | B10 |
|------|-----|-----|-----|------|-----|-----|-----|-----|-----|
| B11 | B12 | B13 | B11p | B10p | B06p | B07p | B08p | B09p | B04p |
| A05p | B06p | B03p | B11p | B12p | B06p | B02p |  |  |  |

Vtape3 Representation:

| C01 | C02 | B03p | C04 | A05p | B06p | C07 | C08 | C09 | C10 |
|-----|-----|------|-----|------|------|-----|-----|-----|-----|
| C11 | C12 | C13 | C14 | C15 | C16 | C17 | C08p | C09p | C01p |
| C01p | C10p | C07p | C11p | C12p | C15p | C02p | C09p |  |  |

Vtape4 Representation:

| A01p | D02 | B03p | D04 | A05p | B06p | D07 | D08 | D09 | D10 |
|------|-----|------|-----|------|------|-----|-----|-----|-----|
| D11 | D12 |  |  |  |  |  |  |  |  |

Vtape5 Representation:

| A01p | B02p | B03p | A04p | A05p | E06 |
|------|------|------|------|------|-----|

Vtape6 Representation:

| F01 | B02p | F03 | F04 | F05 | F06 | F07 | F08 | F09 |
|-----|------|-----|-----|-----|-----|-----|-----|-----|

In these examples, Vtape1 comprises 15 unique chunks with the ID A01-A15. As is illustrated, chunks A01, A04, and A05 are also referenced by Vtape2, Vtape3, Vtape4, and Vtape5. Vtape2 comprises 27 chunks, where there are 11 unique chunks, Vtape2 also comprises 3 chunks that are also referenced by other Vtapes, those being B02, B03 and B06. Additionally, Vtape2 comprises two pointers to chunks of another Vtape, Vtape1, that point to chunks (A01p and A05p).

From the Vtape representations, de-duplication migration/copy logic 204 may derive another representation that illustrates how much native capacity each Vtape has, how much capacity each Vtape has after de-duplication, and the number of multi-referenced chunks, which is illustrated by the following virtual tapes stored on internal storage system table.

TABLE 2

Virtual tapes stored on internal storage system table.

| Vtape | [native-Vtape-size] | [dedup-Vtape-size] | [multi-ref-chunks] |
|-------|---------------------|--------------------|--------------------|
| Vtape1 | 15 | 15 | 3 |
| Vtape2 | 27 | 13 | 3 |
| Vtape3 | 28 | 17 | 0 |
| Vtape4 | 12 | 12 | 0 |
| Vtape5 | 6 | 6 | 0 |
| Vtape6 | 9 | 9 | 0 |

As is illustrated, de-duplication logic 202 has stored six Vtapes on internal storage system 208, Vtape1 has a 15 MB native size, which indicates that no data of this tape has been de-duplicated (no identical chunks). The de-duplicated size of Vtape2 is 13 MB, because it has only 13 unique chunks and 14 pointers to chunks. Also, Vtape1 has 3 chunks which are referenced by other tapes.

In order for de-duplication migration/copy logic 204 to perform migration/copy of de-duplicated data from internal storage system 208 to removable storage system 210, de-duplication migration/copy logic 204 generates a chunk reference table comprising all multi-referenced chunks summarized in the virtual tapes stored on internal storage system table and Vtape representations above.

TABLE 3

Chunk reference table.

|  | Chunk A01 | Chunk A04 | Chunk A05 | Chunk B02 | Chunk B03 | Chunk B06 |
|--|-----------|-----------|-----------|-----------|-----------|-----------|
| references | 3 | 1 | 5 | 2 | 3 | 2 |

According to the chunk reference table, chunk A01 is referenced three times by other tapes, chunk A04 is referenced once, chunk A05 is referenced five times, chunk B02 is referenced twice, chunk B03 is referenced three times, and chunk B06 is referenced twice.

Using the chunk-reference-table, de-duplication migration/copy logic 204 generates a chunk matrix table that indicates, for each Vtape, which chunk is referenced. A value of 1 indicates whether the chunk is referenced at least one time by the Vtape and a value of 0 indicates whether the Vtape does not reference that specific chunk.

TABLE 4

Chunk-matrix table.

| Vtape/chunk | Chunk A01 | Chunk A04 | Chunk A05 | Chunk B02 | Chunk B03 | Chunk B06 |
|-------------|-----------|-----------|-----------|-----------|-----------|-----------|
| Vtape1 | 1 | 1 | 1 | 0 | 0 | 0 |
| Vtape2 | 1 | 0 | 1 | 1 | 1 | 1 |
| Vtape3 | 0 | 0 | 1 | 0 | 1 | 1 |
| Vtape4 | 1 | 0 | 1 | 0 | 1 | 1 |
| Vtape5 | 1 | 1 | 1 | 1 | 1 | 0 |
| Vtape6 | 0 | 0 | 0 | 1 | 0 | 0 |

Using the chunk-matrix table, de-duplication migration/copy logic 204 generates an n-dimensional representation of the points in the chunk matrix table for each Vtape, as illustrated by the following:

Vtape1=(1/1/1/0/0/0)
Vtape2=(1/0/1/1/1/1)
Vtape3=(0/0/1/0/1/1)
Vtape4=(1/0/1/0/1/1)

Vtape5=(1/1/1/1/1/0)
Vtape6=(0/0/0/1/0/0)

With the representation of the Vtapes as points in an n-dimensional room, de-duplication migration/copy logic 204 calculates the aforementioned metric. In one embodiment, de-duplication migration/copy logic 204 may calculate the metric by calculating an Euclidian distance between each two Vtapes, x and y, using the following square-root of the sum-of-the-squares of the differences of the distances algorithm:

$$d(x, y) = \sqrt{\sum_{i=1}^{n}(x_i - y_i)^2}$$

where for two points $x(x_1, \ldots, x_n)$ and $y(y_1, \ldots, y_n)$ the Euclidean distance is calculated. In the language of topology, the Euclidean distance is the Lebesgue space $L_2$ metric. In another embodiment, the square root is not taken in the above sum-of-the-squares of the differences of the respective distances algorithm, to provide a non-Euclidean metric which gives more weight to clusters further apart. In yet another embodiment, the metric is a non-Euclidean distance calculated as the Lebesgue space $L_1$ metric, namely as the sum of the absolute-values of the differences of the respective distances, $d(x,y)=\Sigma|x_i-y_i|$. In yet another embodiment, "total-time" is used as the metric instead of "distance." This total-time would be, for example, the sum of the individual times for (a) the robotic picker to travel to the storage slot containing the removable media, (b) the time to grasp the removable media from its storage slot, (c) the time for the robotic picker to travel to the media drive, (d) the time to load the removable media into the media drive, and (e) the time to seek to one or more desired chunks. Although these four algorithms differ, they all topologically define a metric.

De-duplication migration/copy logic 204 inserts the resulting exemplary Euclidean distance values into a metric matrix [M] as follows:

TABLE 5

Metric matrix [M].

| Vtape/Vtape | Vtape1 | Vtape2 | Vtape3 | Vtape4 | Vtape5 | Vtape6 |
|---|---|---|---|---|---|---|
| Vtape1 | x | x | x | x | x | x |
| Vtape2 | 2,000 | x | x | x | x | x |
| Vtape3 | 2,000 | 1,414 | x | x | x | x |
| Vtape4 | 1,732 | 1,000 | 1,000 | x | x | x |
| Vtape5 | 1,414 | 1,414 | 2,000 | 1,732 | x | x |
| Vtape6 | 2,000 | 2,000 | 2,000 | 2,236 | 2,000 | x |

De-duplication migration/copy logic 204 then determines a preliminary number of clusters to be generated by taking the square root of the number of Vtapes ($\sqrt{\text{Vtape\_count}}$), for example $\sqrt{6}=2.449\approx2$. Therefore, de-duplication migration/copy logic 204 determines that the migration/copy process should initially start with two preliminary clusters.

De-duplication migration/copy logic 204 searches the metric matrix [M] for the two shortest distances between Vtapes and generates two clusters. In this instance the two clusters would be:
Cluster24 (Vtape2 & Vtape4)=1,000
Cluster34 (Vtape3 & Vtape4)=1,000
As is shown, there are cases where there are two clusters comprising the same Vtape. In such cases, de-duplication migration/copy logic 204 analyzes both clusters even though, in a later step, the common Vtape will be exclusively added to only a more efficient cluster.

According to the determined clusters, de-duplication migration/copy logic 204 enhances the chunk-matrix table with a preceding cluster-chunk reference portion as follows:

TABLE 6

Enhanced chunk matrix table.

| | Chunk A01 | Chunk A04 | Chunk A05 | Chunk B02 | Chunk B03 | Chunk B06 |
|---|---|---|---|---|---|---|
| Cluster/chunk | | | | | | |
| Cluster24 | 1 | 0 | 1 | 1 | 1 | 1 |
| Cluster34 | 1 | 0 | 1 | 0 | 1 | 1 |
| Vtape/chunk | | | | | | |
| Vtape1 | 1 | 1 | 1 | 0 | 0 | 0 |
| Vtape2 | 1 | 0 | 1 | 1 | 1 | 1 |
| Vtape3 | 0 | 0 | 1 | 0 | 1 | 1 |
| Vtape4 | 1 | 0 | 1 | 0 | 1 | 1 |
| Vtape5 | 1 | 1 | 1 | 1 | 1 | 0 |
| Vtape6 | 0 | 0 | 0 | 1 | 0 | 0 |

De-duplication migration/copy logic 204 selects a best cluster by determining which cluster has the most common chunks within as few Vtapes as possible:
Cluster24: 5 common chunks by using 2 Vtapes→5/2=2.5
Cluster34: 4 common chunks by using 2 Vtapes→4/2=2.0
De-duplication migration/copy logic 204 determines that Cluster24 has the better factor than Cluster34. If de-duplication migration/copy logic 204 determines that two clusters have the same factor, then de-duplication migration/copy logic 204 randomly chooses one of the clusters.

Once a best cluster is chosen, de-duplication migration/copy logic 204 determines whether the chosen cluster may b stored on removable storage system 210 based on the [export-size] of the chosen cluster and the available capacity of removable storage system [rsm-size]. To determine the [export-size] of the chosen cluster, de-duplication migration/copy logic 204 uses the following formula:

((for each Vtape of the cluster: (the [dedup-Vtape-size]–references to other tapes in the cluster [multi-ref-chunks pointing to VtapeX]–common references to Vtapes not being part of the cluster)–common references to Vtapes not being part of the cluster).

For cluster24:
Vtape2: [dedup-Vtape-size]–[multi-ref-chunks pointing to Vtape4]–[common references to other Vtapes], which would be:
Vtape2: 13-0-2(A01p, A05p)=11 chunks
Vtape4: [dedup-Vtape-size] [multi-ref-chunks pointing to Vtape2]–[common references to other Vtapes]
Vtape4: 12-2(B03p, B06p)–2(A01p, A05p)=8 chunks
common-references to other chunks=2 chunks (A01p, A05p)
Thus, the size of the chosen cluster [dedup-cluster-size] would be: 11+8+2=21 chunks, which would be equivalent to an [export-size] of 21 MB.

De-duplication migration/copy logic 204 then determines whether the [export-size] is greater than the available capacity of removable storage system [rsm-size]. If de-duplication migration/copy logic 204 determines that the [export-size] is greater than the [rsm-size], de-duplication migration/copy logic 204 adds the cluster arrangement to a list of forbidden clusters. Although not exemplified, if the chosen cluster comprised more than two Vtapes, de-duplication migration/copy logic 204 removes the last added cluster element from the cluster and determines whether the new [export-size] of the modified cluster is greater than the available capacity of removable storage system [rsm-size]. If the [export-size] of the cluster is not reduced by a sufficient size as to be adequately stored on removable storage system 210, then de-duplication migration/copy logic 204 adds the reduced cluster to a list of forbidden clusters and again removes the last added cluster element from the cluster until only two Vtapes remain. If only two Vtapes remain and thus removal of one Vtape would result in the elimination of the cluster, de-duplication migration/copy logic 204 adds the reduced cluster arrangement to the list of forbidden clusters and chooses a new best cluster.

If de-duplication migration/copy logic 204 determines that the [export-size] of the cluster is less than the available capacity of removable storage system [rsm-size], then de-duplication migration/copy logic 204 determines whether the [export-size] exceeds the capacity of the removable storage system minus an optional predefined safety margin [rsm-threshold]. The threshold of the optional predefined safety margin may be 85% of [rsm-size], so for example 0.85*40 MB=34 MB. If the [export-size] is greater than [rsm-threshold], de-duplication migration/copy logic 204 modifies references in the chosen cluster arrangement that are not part of the cluster to no longer reference those clusters. De-duplication migration/copy logic 204 then exports the cluster to removable storage system 210. Once the Vtape cluster has been exported, de-duplication migration/copy logic 204 deletes all entries associated with the Vtapes of the cluster from the Vtape-Vtape-matrix and all other clusters.

Additionally, once de-duplication migration/copy logic 204 deletes all entries associated with the Vtapes of the cluster from the Vtape-Vtape-matrix and all other clusters, de-duplication migration/copy logic 204 may delete all data associated with the exported cluster from internal storage system 208. That is, de-duplication migration/copy logic 204 may perform the migration/copy process for numerous reasons, such as back-up, recovery, space management in internal storage system 208, or the like. With regard to space management, space in internal storage system 208 is typically of higher value with respect to both performance and cost. Thus, data is migrated/copied from internal storage system 208 to removable storage system 210 in order to reduce cost and improve performance. When de-duplication migration/copy logic 204 delete data associated with the exported cluster from internal storage system 208, de-duplication migration/copy logic 204 may insert a reference of the deleted data to a respective removable storage system 210. The reference may be a reference table where the exported clusters from internal storage system 208 are mapped to removable storage system 210, which may include volume identifier, a stub-file or block, an empty file or block, or the like, which references the respective removable storage system 210 to which the data associated with the exported cluster has been exported. De-duplication migration/copy logic 204 determines whether there are additional Vtapes still to migrate/copy to a different removable storage system 210. If there are additional Vtapes still to be migrated/copied, then de-duplication migration/copy logic 204 reapplies the de-duplication migration/copy process to the remaining Vtapes. If there are no additional Vtapes, then de-duplication migration/copy logic 204 ends the migration/copy process.

If [export-size] is equal to or less than the [rsm-threshold], de-duplication migration/copy logic 204 determines whether there are additional Vtapes still to migrate/copy. If there are no Vtapes left, then de-duplication migration/copy logic 204 may prompt the user as to whether the migration/copy process should be continued because the [rsm-threshold] has not been reached, making it ineffective to export the Vtape cluster. If the user indicates to proceed with the migration/copy process, de-duplication migration/copy logic 204 modifies references in the chosen cluster arrangement that are not part of the cluster, to no longer reference those clusters. De-duplication migration/copy logic 204 exports the cluster as is to removable storage system 210, Once the Vtape cluster has been exported, de-duplication migration/copy logic 204 deletes all entries associated with the Vtapes of the cluster from the Vtape-Vtape-matrix and all other clusters. Again, de-duplication migration/copy logic 204 may also delete all data associated with the exported cluster from internal storage system 208 depending on the purpose for which the migration/copy process is being performed, De-duplication migration/copy logic 204 again determines whether there are additional Vtapes still to migrate/copy to a different removable storage system 210. However, since de-duplication migration/copy logic 204 has already determined that there are no additional Vtapes, de-duplication migration/copy logic 204 ends the migration/copy process.

If there are additional Vtapes to migrate/copy, de-duplication migration/copy logic 204 generates an n-dimensional representation of the selected best cluster in the enhanced chunk matrix table, as illustrated by the following:

Cluster24=(1/0/1/1/1/1)

De-duplication migration/copy logic 204 calculates a Euclidian distance of all Vtapes points to the selected best cluster points. De-duplication migration/copy logic 204 inserts the resulting exemplary Euclidean distance values into a Vtape-cluster matrix as follows:

TABLE 7

Vtape-cluster matrix.

| Vtape/cluster | Cluster24 |
|---|---|
| Vtape1 | 2,000 |
| Vtape2 | x |
| Vtape3 | 1,414 |
| Vtape4 | x |
| Vtape5 | 1,414 |
| Vtape6 | 2,000 |

De-duplication migration/copy logic 204 then adds the Vtape with the shortest Euclidian distance to selected best cluster point to the selected best cluster, if that cluster arrangement is not on the forbidden-clusters list. If two or more Vtapes have the same shortest Euclidean distance to the selected best cluster, de-duplication migration/copy logic 204 generates the clusters as follows:

Cluster24+Vtape3=cluster243

Cluster24+Vtape5=cluster245

Thus, in this example, the following clusters have now been generated by de-duplication migration/copy logic 204:

Cluster243

Cluster245

Cluster34 (from previous generation)

It should be noted that, after this step, two matching clusters may have been generated by de-duplication migration/copy logic 204. If two matching clusters exist, de-duplication migration/copy logic 204 would delete one of the matching instances. In this example, since there are no matching clusters, de-duplication migration/copy logic 204 would repeat the process until the cluster is exported. That is, de-duplication migration/copy logic 204 enhances the chunk-matrix table with the two new clusters as follows:

TABLE 8

Enhanced chunk matrix table.

| | Chunk A01 | Chunk A04 | Chunk A05 | Chunk B02 | Chunk B03 | Chunk B06 |
|---|---|---|---|---|---|---|
| Cluster/ chunk | | | | | | |
| Cluster243 | 1 | 0 | 1 | 1 | 1 | 1 |
| Ctuster245 | 1 | 1 | 1 | 1 | 1 | 1 |
| Cluster34 | 1 | 0 | 1 | 0 | 1 | 1 |
| Vtape/ chunk | | | | | | |
| Vtape 1 | 1 | 1 | 1 | 0 | 0 | 0 |
| Vtape2 | 1 | 0 | 1 | 1 | 0 | 1 |
| Vtape3 | 0 | 0 | 1 | 0 | 1 | 1 |
| Vtape4 | 1 | 0 | 1 | 0 | 1 | 1 |
| Vtape5 | 1 | 1 | 1 | 1 | 1 | 0 |
| Vtape6 | 0 | 0 | 0 | 1 | 0 | 0 |

De-duplication migration/copy logic 204 selects a best cluster by determining which cluster has the most common chunks within as few Vtapes as possible:

Cluster243: 5 common chunks by using 3 Vtapes→5/3=1.666

Cluster245: 6 common chunks by using 3 Vtapes→6/3=2.0

Cluster34: 4 common chunks by using 2 Vtapes→4/2=2.0

If two cluster factors match, like Cluster245 and Cluster34, de-duplication migration/copy logic 204 randomly chooses one cluster.

For example, if de-duplication migration/copy logic 204 chooses cluster34, de-duplication migration/copy logic 204 determines whether the chosen cluster may be stored on removable storage system 210 based on the [export-size] of the chosen cluster and the available capacity of removable storage system [rsm-size].

For cluster34:

Vtape3: [dedup-Vtape-size]–[multi-ref-chunks pointing to Vtape4]–[common references to other Vtapes], which would be:

Vtape3: 17-0-3(A05p, B03p, B06p)=14 chunks

Vtape4: [dedup-Vtape-size]–[multi-ref-chunks pointing to Vtape3]–[common references to other Vtapes], which would be:

Vtape4: 12-0-3 (A05p, B03p, B06p)=9 chunks common-references to other chunks=3 chunks (A05p, B03p, B06p)

Thus, the size of the chosen cluster dedup-cluster-size would be: 14+9+3=26 chunks, which would be equivalent to an [export-size] of 26 MB.

Since the determined 26 MB is less than the [rms-size] and less than the [rms-threshold], de-duplication migration/copy logic 204 determines whether there are additional Vtapes still to migrate/copy. Since there are additional Vtapes to migrate, de-duplication migration/copy logic 204 generates an n-dimensional representation of the selected best cluster in the enhanced chunk matrix table, as illustrated by the following:

Cluster34 (1/0/1/0/1/1)

De-duplication migration/copy logic 204 calculates a Euclidian distance of all Vtapes points to the selected best cluster points. De-duplication migration/copy logic 204 inserts the resulting exemplary Euclidean distance values into a Vtape-cluster matrix as follows:

TABLE 9

Vtape-cluster matrix.

| Vtape/ cluster | Cluster34 |
|---|---|
| Vtape1 | 1,732 |
| Vtape2 | 1,000 |
| Vtape3 | x |
| Vtape4 | x |
| Vtape5 | 1,732 |
| Vtape6 | 2,236 |

According to the Vtape-c luster matrix, Vtape2 is the one with the shortest distance to cluster34; therefore, de-duplication migration/copy logic 204 then adds the Vtape with the shortest Euclidian distance to selected best cluster point to the selected best cluster and cluster342 is created.

Thus, in this example, the following clusters have now been generated by de-duplication migration/copy logic 204:

Cluster243

Cluster245

Cluster342

Since cluster243 and cluster342 are the same, de-duplication migration/copy logic 204 deletes one instance. Therefore, only Cluster243 and Cluster245 are left. De-duplication migration/copy logic 204 again enhances the chunk-matrix table with a preceding cluster-chunk reference portion and selects a best cluster by determining which cluster has the most common chunks within as few Vtapes as possible:

Cluster243: 5 common chunks by using 3 Vtapes→5/3=1.666

Cluster245: 6 common chunks by using 3 Vtapes→6/3=2.0

De-duplication migration/copy logic 204 determines that cluster243 has the better factor than Cluster245. De-duplication migration/copy logic 204 determines whether the chosen cluster may be stored on removable storage system 210 based on the [export-size] of the chosen cluster and the available capacity of removable storage system [rsm-size].

For cluster243:

Vtape2: [dedup-Vtape-size]–[multi-ref-chunks pointing to Vtape4]–[multi-ref-chunks pointing to Vtape3]–[common references to other Vtapes], which would be:

Vtape2: 13-0-0-2 (A01p, A05p)=11 chunks

Vtape4: [dedup-Vtape-size]–[multi-ref-chunks pointing to Vtape2]–[multi-ref-chunks pointing to Vtape3]–[common references to other Vtapes]

Vtape4: 17-2 (B03p, B06p)-0-1 (A01p, A05p)=8 chunks

Vtape3: [dedup-Vtape-size]–[multi-ref-chunks pointing to Vtape2]–[multi-ref-chunks pointing to Vtape4]–[common references to other Vtapes]

Vtape3: 17-2 (B03p, B06p)-0-1 (A05p)=14 chunks common-references to other chunks=2 chunks (A01p, A05p)

Thus, the size of the chosen cluster [dedup-cluster-size] would be: 11+8+14+2=35 chunks, which would be equivalent to an [export-size] of 35 MB.

Since cluster243 is less than the [rms-size] and greater than the [rms-threshold], de-duplication migration/copy logic 204 modifies references in the chosen cluster arrangement that are not part of the cluster to no longer reference those clusters. For example, A01p in Vtape2 is modified to be a unique chunk. De-duplication migration/copy logic 204 then exports cluster234. De-duplication migration/copy logic 204 deletes all clusters comprising Vtape2, Vtape3, or Vtape4 and removes all entries for those Vtapes from the Vtape-Vtape-matrix, leaving:

TABLE 10

Metric matrix [M].

| Vtape/Vtape | Vtape1 | Vtape5 | Vtape6 |
|---|---|---|---|
| Vtape1 | x | X | x |
| Vtape5 | 1,414 | X | x |
| Vtape6 | 2,000 | 2,000 | x |

Then, de-duplication migration/copy logic 204 repeats the process until all Vtapes have been migrated/copied.

Once de-duplication migration/copy logic 204 identifies a cluster to be exported, de-duplication migration/copy logic 204 proceeds with organizing the data associated with the Vtapes in the cluster in such a manner as to, for example, avoid a constant forward/backward winding of a tape if the removable storage system 210 is a tape storage medium, movement of disk heads if the removable storage system 210 is an external hard disk drive, movement of a laser head if the removable storage system 210 is a optical disc storage media, or the like.

As determined previously, for cluster243:
Vtape2: [dedup-Vtape-size]–[multi-ref-chunks pointing to Vtape4]–[multi-ref-chunks pointing to Vtape3]–[common references to other Vtapes], which would be:
Vtape2: 13-0-0-2 (A01p, A05p)=11 chunks
Vtape4: [dedup-Vtape-size]–[multi-ref-chunks pointing to Vtape2]–[multi-ref-chunks pointing to Vtape3]–[common references to other Vtapes]
Vtape4: 12-2(B03p, B06p)-0-2 (A01p, A05p)=8 chunks
Vtape3: [dedup-Vtape-size]–[multi-ref-chunks pointing to Vtape2]–[multi-ref-chunks pointing to Vtape4]–[common references to other Vtapes]
Vtape3: 17-2 (B03p, B06p)-0-1 (A05p)=14 chunks
common-references to other chunks=2 chunks (A01p, A05p)

Thus, the size of the chosen cluster [dedup-cluster-size] would be: 11+8+14+2=35 chunks or an [export-size] of 35 MB. As discussed above, an exemplary capacity of a removable storage system 210 [rms-size] is 40 MB.

The chunk-layout of cluster234 is as follows:

TABLE 11

Chunk-layout table.

| Vtape/chunk | Chunk A01 | Chunk A04 | Chunk A05 | Chunk B02 | Chunk B03 | Chunk B06 |
|---|---|---|---|---|---|---|
| Vtape2 | 1 | 0 | 1 | 1 | 1 | 1 |
| Vtape3 | 0 | 0 | 1 | 0 | 1 | 1 |
| Vtape4 | 1 | 0 | 1 | 0 | 1 | 1 |

The Vtapes are sorted according to the similarity between each other. Therefore, de-duplication migration/copy logic 204 determines a "nearest neighbor" for each Vtape by generating a Metric matrix [M], as follows:

TABLE 12

Metric matrix [M].

| Vtape/Vtape | Vtape2 | Vtape3 | Vtape4 |
|---|---|---|---|
| Vtape2 | X | x | X |
| Vtape3 | 1,414 | x | X |
| Vtape4 | 1,000 | 1,000 | X |

Based in the Metric matrix [M], de-duplication migration/copy logic 204 selects, as a beginning indication, two Vtapes with a shortest Euclidean distance, in this example, Vtape2 and Vtape4 because Vtape2 and Vtape4 have the most common chunks. De-duplication migration/copy logic 204 then marks Vtape2 and Vtape4 as edges of the sort order. De-duplication migration/copy logic 204 searches for the next Vtape with the next nearest distance to either Vtape2 or Vtape4, which in this case will be Vtape3 that is nearer to Vtape4 than to Vtape2. Therefore, de-duplication migration/copy logic 204 adds Vtape3 to the order and denotes the order of Vtape as Vtape2, Vtape4, and Vtape3, with Vtape2 and Vtape3 as the new Vtape edges. As long as Vtapes are left, de-duplication migration/copy logic 204 enhances the Vtape order. Since there are only 3 Vtapes, the Vtape representation will be as follows:

Vtape2 Representation:

| A01 | B02 | B03 | B04 | A05 | B06 | B07 | B08 | B09 | B10 |
|---|---|---|---|---|---|---|---|---|---|
| B11 | B12 | B13 | B11p | B10p | B06p | B07p | B08p | B09p | B04p |
| A05p | B06p | B03p | B11p | B12p | B06p | B02p | | | |

Vtape4 Representation:

| A01p | D02 | B03p | D04 | A05p | B06p | D07 | D08 | D09 | D10 |
|---|---|---|---|---|---|---|---|---|---|
| D11 | D12 | | | | | | | | |

Vtape3 Representation:

| C01 | C02 | B03p | C04 | A05p | B06p | C07 | C08 | C09 | C10 |
|---|---|---|---|---|---|---|---|---|---|
| C11 | C12 | C13 | C14 | C15 | C16 | C17 | C08p | C09p | C01p |
| C01p | C10p | C07p | C11p | C12p | C15p | C02p | C09p | | |

According to above grouping, de-duplication migration/copy logic 204 writes the Vtapes to removable storage system 210 in following order (numbers 1-70 are the positions on removable storage system 210):

| 1 (Vtape2 start) | 2 | 3 | 4 | 5 | 6 | 7 |
|---|---|---|---|---|---|---|
| A01 | B02 | B03 | B04 | A05 | B06 | B07 |
| 8 | 9 | 10 | 11 | 12 | 13 | 14 |
| B08 | B09 | B10 | B11 | B12 | B13 | B11p |
| 15 | 16 | 17 | 18 | 19 | 20 | 21 |
| B10p | B06p | B07p | B08p | B09p | B04p | A05p |
| | | | | | 27 (Vtape2 | 28 (Vtape4 |

-continued

| 22 | 23 | 24 | 25 | 26 | end) | start) |
|---|---|---|---|---|---|---|
| B06p 29 | B03p 30 | B11p 31 | B12p 32 | B06p 33 | B02p 34 | A01p 35 |
| D02 36 | B03p 37 | D04 38 | A05p 39 (Vtape4 end) | B06p 40 (Vtape3 start) | D07 41 | D08 42 |
| D09 43 | D10 44 | D11 45 | D12 46 | C01 47 | C02 48 | B03p 49 |
| C04 50 | A05p 51 | B06p 52 | C07 53 | C08 54 | C09 55 | C10 56 |
| C11 57 | C12 58 | C13 59 | C14 60 | C15 61 | C16 62 | C17 63 |
| C08p 64 | C09p 65 | C01p 66 | C01p 67 (Vtape3 end) | C10p 68 | C07p 69 | C11p 70 |
| C12p | C15p | C02p | C09p | | | |

In a further embodiment, rather than writing only the first instance of the chunk, de-duplication migration/copy logic 204 may write only the last instance of a chunk, which would result in the Vtapes being written to removable storage system 210 in following order:

| 1 (Vtape2 start) | 2 | 3 | 4 | 5 | 6 | 7 |
|---|---|---|---|---|---|---|
| A01p 8 | B02p 9 | B03p 10 | B04p 11 | A05p 12 | B06p 13 | B07p 14 |
| B08p 15 | B09p 16 | B10p 17 | B11p 18 | B12p 19 | B13 20 | B11p 21 |
| B10 22 | B06p 23 | B07 24 | B08 25 | B09 26 | B04 27 (Vtape2 end) | A05p 28 (Vtape4 start) |
| B06p 29 | B03p 30 | B11 31 | B12 32 | B06p 33 | B02 34 | A01 35 |
| D02 36 | B03p 37 | D04 38 | A05p 39 (Vtape4 end) | B06p 40 (Vtape3 start) | D07 41 | D08 42 |
| D09 43 | D10 44 | D11 45 | D12 46 | C01p 47 | C02p 48 | B03 49 |
| C04 50 | A05 51 | B06 52 | C07p 53 | C08p 54 | C09p 55 | C10p 56 |
| C11p 57 | C12p 58 | C13 59 | C14 60 | C15p 61 | C16 62 | C17 63 |
| C08 64 | C09p 65 | C01p 66 | C01 67 (Vtape3 end) | C10 68 | C07 69 | C11 70 |
| C12 | C15 | C02 | C09 | | | |

Whether de-duplication migration/copy logic 204 determines to write the first instance of the chunk or the last instance of a chunk, prior to writing the chunks to the removable storage system 210, de-duplication migration/ copy logic 204 may determine an amount of capacity that will remain on removable storage system 210. For example, a unique data chunk may have a size of 1 MB and a pointer may have a size of 1 kB. In the above examples there are 67 chunk positions of which there are 32 pointers and 35 unique chunks. Thus, the amount of data to be written to removable storage system 210 is effectively: 35*1 MB data+32*1 kB pointers=35,032 MB. If the initial available capacity of removable storage system 210 is 40 MB, then after de-duplication migration/copy logic 204 writes the data to removable storage system 210, the remaining space would be: 40 MB−35,032 MB=4,968 MB.

If there is free space on removable storage system 210, instead of wasting this remaining space, de-duplication migration/copy logic 204 may use this space to write chunks twice in order to avoid constant forward/backward winding of a tape if the removable storage system 210 is a tape storage medium, movement of disk heads if the removable storage system 210 is an external hard disk drive, movement of a laser head if the removable storage system 210 is a optical disc storage media, or the like. In order to decide which chunks should be written twice, de-duplication migration/copy logic 204 may implement various policies. For example, based on the implemented policies, de-duplication migration/copy logic 204 may write the most referenced chunk multiple times, write the chunks twice that have the biggest distance between first and last occurrence, rewrite a chunk that that is determined to have a longest distance between the original chunk and a pointer to the original chunk thereby decreasing the reference distances, or the like. Once de-duplication migration/copy logic 204 determines how the available space of removable storage system 210 is to be allocated, whether or not the free space is tilted with additional chunks, de-duplication migration/copy logic 204 writes the data in the determined configuration to removable storage system 210.

In a further embodiment, de-duplication migration/copy logic 204 may write the most referenced chunks at the beginning of removable storage system 210 in a special pattern such that microcode is driven to fetch these most referenced chunks into non-volatile random access memory (NVRAM) and dereference these chunks upon reading.

As would be readily recognizable to one of ordinary skill in the art, both internal storage medium 208 and removable storage system 210 may be accessible by a backup application within data processing system 200 at various points in time. Thus, the backup application may need to read either from internal storage system 208 or removable storage system 210 if data has already been migrated/copied. Therefore, de-duplication migration/copy logic 204 may need to notify such backup applications when Vtapes have been migrated/copied to removable storage system 210. That is, backup applications may track Vtape locations using the following:

| Barcode | Data begin (sector) | Data end (sector) | Library |
|---|---|---|---|
| 000001L3 | 0x0000001 | 0x0000015 | 0007650 |

Upon receipt of a notification from removable storage system 210, the backup application may update the Vtape location to the following:

| Barcode | Data begin (sector) | Data end (sector) | Library |
|---|---|---|---|
| 123456L5 | 0x0000087 | 0x0000100 | 0003584 |

As wilt be appreciated by one skilled in the art, the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in any one or more computer readable medium(s) having computer usable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in a baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Computer code embodied on a computer readable medium may be transmitted using any appropriate medium, including but not limited to wireless, wireline, optical fiber cable, radio frequency (RF), etc., or any suitable combination thereof.

Computer program code for carrying out operations for aspects of the present invention may be written in any combination of one or more programming languages, including an object oriented programming language such as Java™, Smalltalk™, C++, or the like, and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to the illustrative embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions that implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus, or other devices to produce a computer implemented process such that the instructions which execute on the computer or other programmable apparatus provide processes for implementing the functions/acts specified in the flowchart and/or block diagram block or blocks.

FIGS. 3A-3D depict a flow diagram of the operation performed by de-duplication migration/copy logic in optimizing migration/copy of de-duplicated data from an internal storage system to a removable storage system in accordance with an illustrative embodiment. As the operation begins, the de-duplication migration/copy logic generates a chunk reference table comprising all multi-referenced chunks summarized in virtual tapes stored on the internal storage system (step 302). Using the chunk-reference-table, the de-duplication migration/copy logic generates a chunk matrix table that indicates, for each Vtape, which chunk is referenced (step 304). Using the chunk-matrix table, the de-duplication migration/copy logic generates an n-dimensional representation of the points in the chunk matrix table for each Vtape (step 306).

With the representation of the Vtapes as points in an n-dimensional room, the de-duplication migration/copy logic calculates a metric between each two Vtapes (step 308). The de-duplication migration/copy logic inserts the resulting metric values into a Metric matrix [M] (step 310). The de-duplication migration/copy logic determines a preliminary number of clusters to be generated (step 312). The de-duplication migration/copy logic searches the Metric matrix [M] for the shortest distances between Vtapes (step 314) and generates the identified number of clusters in an enhanced chunk-matrix table with a preceding cluster-chunk reference portion (step 316). The de-duplication migration/ copy logic selects a best cluster by determining which cluster has the most common chunks within as few Vtapes as possible (step 318).

Once a best cluster is chosen, the de-duplication migration/copy logic determines whether the chosen cluster may be stored on the removable storage system based on the [export-size] of the chosen cluster and the available capacity of removable storage system [rsm-size] by determining whether the [export-size] is greater than the available capacity of removable storage system [rsm-size] (step 320), If at step 320 the de-duplication migration/copy logic determines that the [export-size] is greater than the [rsm-size], the de-duplication migration/copy logic adds the cluster arrangement to a list of forbidden clusters (step 322). The de-duplication migration/copy logic determines whether the chosen cluster has more than two Vtapes (step 324). If at step 324 the chosen cluster comprises more than two Vtapes, the de-duplication migration/copy logic removes the last added cluster element from the cluster (step 326), with the process returning to step 320 thereafter. If at step 324 only two Vtapes remain and thus removal of one Vtape would result in the elimination of the cluster, the de-duplication migration/copy logic adds the reduced cluster arrangement to the list of forbidden clusters (step 328) with the operation returning to step 318 thereafter.

If at step 320 the de-duplication migration/copy logic determines that the [export-size] of the cluster is less than the available capacity of removable storage system [rsm-size], the de-duplication migration/copy logic determines whether the [export-size] exceeds the capacity of the removable storage system minus an optional predefined safety margin [rsm-threshold] (step 330). If at step 330 the [export-size] is greater than [rsm-threshold], the de-duplication migration/copy logic modifies references in the chosen cluster arrangement that are not part of the cluster to no longer reference those clusters (step 332). The de-duplication migration/copy logic then exports the cluster to the removable storage system (step 334). Once the Vtape cluster has been exported, the de-duplication migration/copy logic deletes all entries associated with the Vtapes of the cluster from the metric matrix [M] and all other clusters (step 336). At this point, depending on the purpose of the migration/copy process, the de-duplication migration/copy logic may delete all data associated with the exported cluster from the internal storage system (step 337). The dc-duplication migration/copy logic determines whether there are additional Vtapes still to migrate/copy to a different the removable storage system (step 338). If at step 338 there are additional Vtapes still to migrate/copy, the operation returns to step 314. If at step 338 there are no additional Vtapes, the operation ends.

If at step 330 the [export-size] is equal to or less than the [rsm-threshold], the de-duplication migration/copy logic determines whether there are additional Vtapes still to migrate/copy (step 340). If at step 340 there are no Vtapes left, the de-duplication migration/copy logic prompts the user as to whether the migration/copy process should be continued (step 342). If at step 342 the user indicates to proceed with the migration/copy process, the operation proceeds to step 332. If at step 342 the user indicates not to proceed with migration/copy, then the operation ends.

If at step 340 there are additional Vtapes to migrate/copy, the de-duplication migration/copy logic generates an n-dimensional representation of the selected best cluster in the enhanced chunk matrix table (step 344). The de-duplication migration/copy logic calculates a Euclidian distance of all Vtapes points to the selected best cluster points (step 346) and inserts the resulting exemplary Euclidean distance values into a Vtape-cluster matrix (step 348). The de-duplication migration/copy logic then adds the Vtape with the shortest Euclidian distance to selected best cluster point to the selected best cluster if that cluster arrangement is not on the forbidden_clusters list (step 350) with the operation proceeding to step 316 thereafter.

Figure 4:
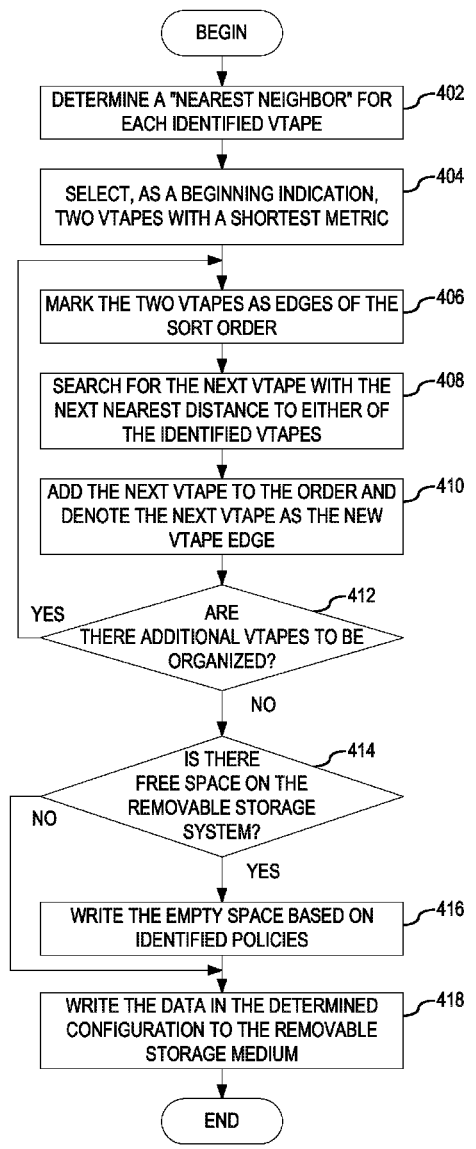
FIG. 4 depicts a flow diagram of the operation performed by de-duplication migration/copy logic in organizing the migration/copy of de-duplicated data from an internal storage system to a removable storage system in accordance with an illustrative embodiment.

FIG. 4 depicts a flow diagram of the operation performed by de-duplication migration/copy logic in organizing the migration/copy of de-duplicated data from an internal storage system to a removable storage system in accordance with an illustrative embodiment. As the operation begins, the de-duplication migration/copy logic determines a "nearest neighbor" for each identified Vtape by generating a Metric matrix [M] (step 402), Based in the Metric matrix [M], the de-duplication migration/copy logic selects, as a beginning indication, two Vtapes with a shortest metric (step 404). The de-duplication migration/copy logic marks the two Vtapes as edges of the sort order (step 406). The de-duplication migration/copy logic searches for the next Vtape with the next nearest distance to either of the identified Vtapes (step 408). The de-duplication migration/copy logic adds the next Vtape to the order and denotes the next Vtape as the new Vtape edge (step 410). The de-duplication migration/copy logic then determines whether there are additional Vtapes to be organized (step 412). If at step 412 there are Vtapes left, the de-duplication migration/copy logic enhances the Vtape order by the operation returning to step 406.

If at step 412 all Vtapes have been organized, the de-duplication migration/copy logic determines an amount of capacity that will remain on the removable storage system (step 414). If at step 414 there is free space on the removable storage system, the de-duplication migration/copy logic writes the empty space based on identified policies (step 416). From step 416 or if at step 414 there is no free space on the removable storage system, the de-duplication migration/copy logic writes the data in the determined configuration to the removable storage system (step 418), with the operation ending thereafter.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Thus, the illustrative embodiments provide mechanisms for migrating/copying de-duplicated data to removable storage system while keeping the data object chunk and all references to the data object chunk together on a same piece of removable media. A de-duplication engine performs a de-duplication process that selects a set of unique chunks pertaining to a set of data objects that may be adequately stored on a piece of removable storage system. That is, the mechanisms of the illustrative embodiments identify unique chunks for all data objects to be migrated/copied to a removable storage system from a de-duplication table that tracks the chunks associated with the data objects. If a set of similar-chunk clusters are identified that may adequately be stored on the removable storage system, then the set of clusters are migrated/copied onto the removable storage system.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art, such as using Vdisk for virtual optical disks as an alternate embodiment to Vtape, since optical disks such as compact disk (CD), digital versatile disks (DVD), and Blu-Ray disks (BD) are also removable media. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method, in a data processing system, for optimizing migration/copying of de-duplicated data from an internal storage system to a removable storage system, the method comprising:
   determining a preliminary number of clusters to be generated for sets of data objects stored on the internal storage system based on a number of the sets of data objects;
   generating the preliminary number of clusters based on shortest distances between the sets of data objects, wherein each cluster comprises one or more sets of data objects and wherein each set of data objects comprises one or more chunks of data;
   identifying a chosen cluster from a set of clusters by identifying a cluster having a greatest number of common chunks within a smallest number of data objects;
   determining whether an export-size of the chosen cluster exceeds an available storage capacity of the removable storage system;
   responsive to the export-size of the chosen cluster failing to exceed the available storage capacity of the removable storage system, exporting the chosen cluster to the removable storage system;
   determining whether the export-size of the chosen cluster exceeds the available capacity of the removable storage system minus a predefined safety margin; and
   responsive to the export-size of the chosen cluster exceeding the available capacity of the removable storage system minus the predefined safety margin, exporting the chosen cluster to the removable storage system;
   responsive to the export-size of the chosen cluster failing to exceed the available capacity of the removable storage system minus the predefined safety margin, determining whether there are additional sets of data objects still to migrate/copy;
   responsive to the existence of the additional sets of data objects still to migrate/copy, adding a next set of data objects with a next shortest distance to the sets of data objects already in the cluster to the chosen cluster;
   determining whether the export-size of the chosen cluster exceeds the available storage capacity of the removable storage system; and
   responsive to the export-size of the chosen cluster failing to exceed the available storage capacity of the removable storage system, exporting the chosen cluster to the removable storage system.

2. The method of claim 1, wherein at least one chunk of data in one set of data objects in the chosen cluster references at least one chunk of data in another set of data objects in the chosen cluster.

3. The method of claim 1, further comprising:
   after the chosen cluster has been exported to the removable storage medium, removing the sets of data objects associated with the chosen cluster from further consideration for migration.

4. The method of claim 3, further comprising:
   after removing the sets of data objects associated with the chosen cluster from further consideration for migration, inserting a reference to a location of the sets of data objects on the removable storage system in the internal storage system; and
   deleting all data associated with the chosen cluster from the internal storage system.

5. The method of claim 1, wherein determining the preliminary number of clusters to be generated for sets of data objects stored on the internal storage system based on a number of the sets of data objects comprises:
   generating a chunk reference table comprising all multi-referenced chunks summarized in sets of data objects stored on the internal storage system;
   generating a chunk matrix table indicating, for each set of data objects, multi-referenced chunks referenced by that set of data objects;
   using the chunk-matrix table, generating an n-dimensional representation of the points in the chunk matrix table for each set of data objects;
   using the representation of the sets of data objects as points in an n-dimensional room, calculating a metric value between each of the sets of data objects indicating distances between each of the sets of data objects; and
   inserting the resulting metric values into a metric matrix.

6. The method of claim 1, further comprising:
responsive to the export-size of the chosen cluster exceeding the available storage capacity of the removable storage system, adding the chosen cluster to a list of forbidden clusters;
determining whether the chosen duster has more than two sets of data objects;
responsive to the chosen cluster having more than two sets of data objects, removing a last added set of data objects from the chosen cluster thereby forming a new cluster;
determining whether a new export-size of the new cluster exceeds the available storage capacity of the removable storage system; and
responsive to the new export-size of the new cluster failing to exceed the available storage capacity of the removable storage system, exporting the new cluster to the removable storage system.

7. The method of claim 1, wherein distances between the sets of data objects are determined based on at least one of a Euclidean distance comprising the square root of the sum of the squares of the difference, a variant of the Euclidean distance where the square root is not taken, the sum of the absolute values of the differences, or a total time of access from one chunk to another chunk.

* * * * *